United States Patent
Giertler

(10) Patent No.: US 10,353,865 B2
(45) Date of Patent: Jul. 16, 2019

(54) ON-DEVICE INDEXING OF HOSTED CONTENT ITEMS

(71) Applicant: Dropbox, Inc., San Francisco, CA (US)

(72) Inventor: Bogo Giertler, Dublin (IE)

(73) Assignee: Dropbox, Inc., San Francisco, CA (US)

( * ) Notice: Subject to any disclaimer, the term of this patent is extended or adjusted under 35 U.S.C. 154(b) by 461 days.

(21) Appl. No.: 14/985,094

(22) Filed: Dec. 30, 2015

(65) Prior Publication Data

US 2017/0192988 A1  Jul. 6, 2017

(51) Int. Cl.
  *G06F 17/30* (2006.01)
  *G06F 16/13* (2019.01)
  *G06F 16/951* (2019.01)

(52) U.S. Cl.
  CPC .......... *G06F 16/134* (2019.01); *G06F 16/951* (2019.01)

(58) Field of Classification Search
  CPC ......... G06F 17/30864; G06F 17/30321; G06F 17/30613
  USPC ........................................................ 707/741
  See application file for complete search history.

(56) References Cited

U.S. PATENT DOCUMENTS

| | | | | |
|---|---|---|---|---|
| 2012/0259824 A1* | 10/2012 | Zagelow | ........... | G06F 17/30336 707/696 |
| 2013/0219176 A1* | 8/2013 | Akella | ............... | H04L 63/0815 713/165 |
| 2013/0262410 A1* | 10/2013 | Liu | ................... | G06F 17/30076 707/693 |
| 2014/0214856 A1* | 7/2014 | Mahkovec | ........ | G06F 17/30073 707/747 |
| 2014/0337458 A1* | 11/2014 | Barton | ................ | H04L 67/2847 709/213 |
| 2015/0052178 A1* | 2/2015 | Zhong | ............... | G06F 17/30109 707/823 |
| 2015/0193347 A1* | 7/2015 | Kluesing | ........... | G06F 17/30132 711/137 |

OTHER PUBLICATIONS

Khandpur et al., Drop Box Blog, "Find what you need faster on iOS 9 with iPhone 6s and iPhone 6s Plus", dated Sep. 16, 2015, 5 pages.

* cited by examiner

*Primary Examiner* — Hosain T Alam
*Assistant Examiner* — Robert F May
(74) *Attorney, Agent, or Firm* — Hickman Palermo Becker Bingham LLP; Adam C. Stone

(57) ABSTRACT

Techniques on on-device indexing of hosted content items are described. In one embodiment, for example, a method is performed at a portable electronic device. The method includes the device performing the operations of: detecting an indexing event within a content management application; determining a content item, hosted with a content management service, to which the indexing event pertains; determining if the indexing event indicates that an index entry for the content item should be added to an on-device index; determining if a proxy entry for the content item already exists in a database that is a read surrogate for the on-device index at least with respect to a content management application by which the content item may be accessed; and attempting to add the index entry to the on-device index, if the proxy entry does not exist in the database.

30 Claims, 12 Drawing Sheets

Portable Electronic Device 100

Portable Electronic Device 100

ON-DEVICE INDEXING OF HOSTED CONTENT ITEMS

TECHNICAL FIELD

The present Application relates to information retrieval. More specifically, the example embodiments of the present invention described below relate to indexing content items hosted with an online content management service in an on-device index.

BACKGROUND

Computers are very powerful tools for searching for relevant information among a vast amount of information. Indexes are a common mechanism for efficiently identifying information of interest among a large corpus of information using a computer. A typical index is an organized mapping of keywords to the documents of information from which the keywords were extracted. As an example, an index of the world's publically accessible web pages may map words in the web pages to the subset of the web pages that contain that word.

Between the actual physical index itself (e.g., the index data as stored on one or more computers) and the users of the system, a search system is typically provided as a software cushion or layer. In essence, the search system shields the user from knowing or even caring about underlying index details. Typically, all requests from users for information in the index are processed by the search system. For example, documents relevant to a user's request for information may be identified by the search system using an index, all without user knowledge of the underlying index implementation. In this manner, the search system provides users quick access to relevant information without concern to how the information is indexed. One well known search system for identifying relevant information among the world's publically accessible web pages is the GOOGLE Internet search engine provided by Google Inc. of Mountain View, Calif.

One function of a search system is to answer search queries (or just "queries" for short). A query may be defined as a logical expression including a set of one or more search terms or keywords, and results in the identification of a subset of indexed items. Consider, for instance, the handling of a request for information from an Internet search engine. In operation, this request is typically issued by a client system as one or more Hyper Text Transfer Protocol ("HTTP") requests for retrieving particular search results from indexes on server computers. For example, a request may be for a list of Internet web pages containing the words "college" and "basketball." In response to this request, the search system typically returns a web page containing hyperlinks to those Internet web pages considered to be most relevant to the search terms "college" and "basketball." Internet search engines are well-suited for searching all the world's information that is publically available on the Internet.

With the ever increasing popularity and computing power of portable electronic devices such as mobile phones, however, more and more digital content is accessible by users from within mobile applications that execute on the portable electronic devices. Mobile applications, or colloquially "apps", are typically downloaded from an Internet "app store" or other Internet application marketplace (e.g., the iOS App Store or Google Play) and installed on the portable electronic devices where they execute and provide dedicated functionality to users. In the last several years, mobile applications have become pervasive and provide a vast array of end-user functionality from gaming to shopping, dining, transportation, social, collaboration, messaging, productivity, and more.

As more and more digital content is made accessible to users by mobile applications at portable electronic devices, a whole new set of challenges face software developers of information retrieval systems: digital content that users would potentially like to search for using a search system may not be available on publically accessible web pages on the Internet where it can be indexed by an Internet search engine. A particular set of challenges involves how to index mobile content so that it is searchable by users. Mobile content includes digital content that is accessible by users at portable electronic devices when using mobile applications on the portable electronic devices.

The software industry, in response, introduced a number of products and technologies to address the need to make mobile content searchable, including on-device indexes. An on-device index is an index stored at a portable electronic device that indexes mobile content. With an on-device index, a mobile application on a device can make mobile content searchable by adding entries to the on-device index, typically via an application programming interface (API) offered by an on-device index manager. The on-device index manager may be another mobile application or a component of an operating system of the device. One example of an existing on-device index and on-device index manager is the iOS Spotlight system available on some Apple® iOS devices.

One particular problem that remains for mobile applications is how to effectively manage what is indexed in an on-device index. On-device index managers may offer only a limited API to mobile applications for managing the index. For example, for security and privacy reasons, since the on-device index may be shared by multiple mobile applications on the device, the on-device index manager API may allow only write operations against the on-device index by the mobile applications. Because of the write-only nature of the API, mobile applications cannot read from the on-device index to determine what mobile content is currently indexed and searchable. This can result in data integrity issues with the on-device index. For example, it may be difficult using existing on-device manager APIs to avoid creating duplicative on-device index entries and to determine what mobile content is currently indexed.

The problem is exacerbated with mobile applications for online content management services that host (store) users' content items on Internet-connected server computers. Users may wish to use an on-device indexing system to search their hosted content items. However, because of power, storage, and processing constraints of portable electronic devices, it may not be feasible or practical to index all of the hosted content items in an on-device index. For example, an on-device indexing system may explicitly cap the number of items that can be indexed in the on-device index by a mobile application, which may be a far lower number than the number of content items a user hosts with an online content management service.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The example embodiments of the present invention are illustrated by way of example, and not in way by limitation, in the figures of the accompanying drawings and in which like reference numerals refer to similar elements and in which.

DESCRIPTION OF EXAMPLE EMBODIMENTS

Figure 1:
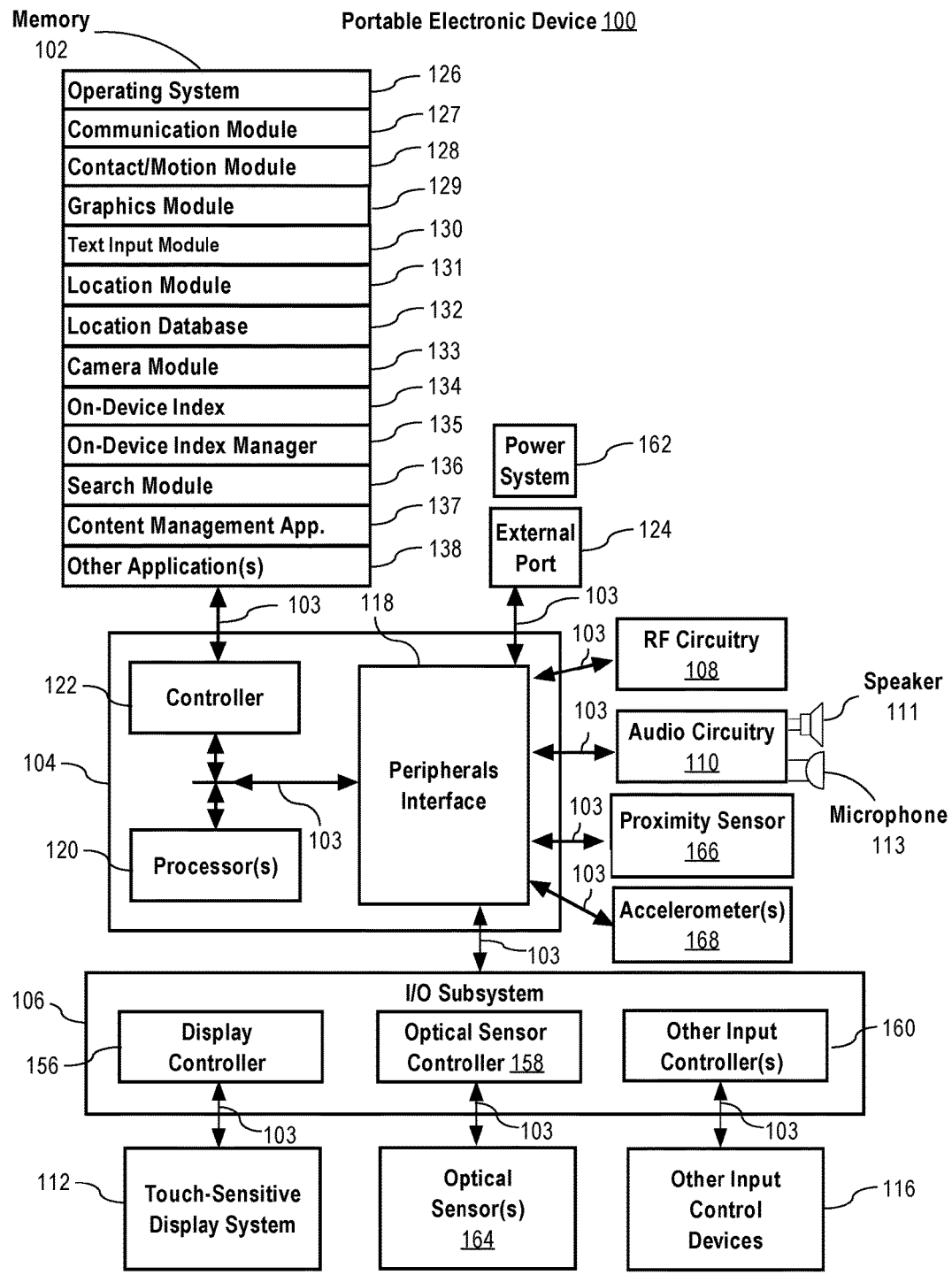
FIG. 1 is a diagram of a basic portable electronic device having a touch screen in which the example embodiments of the present invention may be embodied.

In the following description, for the purposes of explanation, numerous specific details are set forth in order to provide a thorough understanding of example embodiments the present invention. It will be apparent, however, that the example embodiments may be practiced without these specific details. In other instances, well-known structures and devices are shown in block diagram form in order to avoid unnecessarily obscuring the example embodiments.

Overview

Accordingly, there is a need for techniques that allow mobile applications to better reason about the current state of on-device indexes. This need is especially pressing for content management mobile applications. To address this and other needs, computer-implemented techniques for on-device indexing of hosted content items are described below. The techniques may be used to improve the data integrity of on-device indexes with respect to hosted content items indexed in such indexes. The techniques may be used in conjunction with on-device indexing systems, irrespective of whether the on-device index systems offer only a write-only API.

According to some example embodiments of the present invention, the techniques encompass a method performed at a portable electronic device having memory, one or more processors, and one or more programs stored in the memory and configured for execution by the one or more processors. The one or more programs comprise instructions for: detecting an indexing event within a content management application; determining a content item, hosted with a content management service, to which the indexing event pertains; determining if the indexing event indicates that an index entry for the content item should be added to an on-device index; determining if a proxy entry for the content item already exists in a database that is a read surrogate for the on-device index at least with respect to a content management application by which the content item may be accessed; and attempting to add the index entry to the on-device index, if the proxy entry does not exist in the database.

By checking for the existence of the proxy entry in the database that is a read surrogate for the on-device index before attempting to add the index entry to the on-device index, computing resources that would unnecessarily be consumed attempting to add the index entry are conserved, if the proxy entry exists in the read surrogate database.

According to some example embodiments of the present invention, the techniques encompass a method performed at a portable electronic device having memory, one or more processors, and one or more programs stored in the memory and configured for execution by the one or more processors. The one or more programs comprise instructions for: detecting an indexing event within a content management application; determining a content item, hosted with a content management service, to which the indexing event pertains; determining if the indexing event indicates that an index entry for the content item should be removed from an on-device index; determining if a proxy entry for the content item already exists in a database that is a read surrogate for the on-device index at least with respect to a content management application by which the content item may be accessed; and attempting to remove the index entry from the on-device index, if the proxy entry exists in the database.

By checking for the existence of the proxy entry in the database that is a read surrogate for the on-device index before attempting to remove the index entry from the on-device index, computing resources that would unnecessarily be consumed attempting to remove the index entry are conserved, if the proxy entry does not exist in the read surrogate database.

These and other embodiments are described in greater detail below with respect to the Drawings.

Basic Portable Electronic Device

Referring now to FIG. 1, it is a block diagram that illustrates a basic portable electronic device 100 in which the example embodiments may be embodied. Portable electronic device 100 and its components, including their connections, relationships, and functions, is meant to be exemplary only, and not meant to limit implementations of the example embodiments. Other portable electronic devices suitable for implementing the example embodiments may have different components, including components with different connections, relationships, and functions.

While device 100 is a portable or human carry-able, there is no requirement that the example embodiments be embodied in a portable electronic device. The example embodiments can also be embodied in a stationary electronic device such as a desktop computer, a workstation computer, or other stationary computing device. More generally, it should be appreciated that device 100 is only one example of a computing device, and a computing device in which the example embodiments are embodied may have more or fewer components or a different arrangement of components than as shown for device 100 in FIG. 1. The various components shown in FIG. 1 may be implemented in hardware, software, or a combination of both hardware and software, including one or more signal processing and/or application specific integrated circuits (ASICs). The components may communicate over one or more communication buses or signal lines 103.

Memory 102 can include high-speed random access memory and can also include non-volatile memory, such as one or more magnetic disk storage devices, flash memory devices, or other non-volatile solid-state memory devices. Access to memory 102 by other components of device 100, such as CPU 120 and peripherals interface 118, can be controlled by memory controller 122.

Peripherals interface 118 couples the input and output peripherals of device 100 to CPU 120 and memory 102. One or more processors (CPUs) 120 run or execute various software programs and/or sets of instructions stored in memory 102 to perform various functions for device 100 and to process data. In some configurations, peripherals interface 118, CPU 120, and memory controller 122 are implemented on a single chip, such as chip 104. In other configurations, peripherals interface 118, CPU 120, and memory controller 112 are implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some configurations, audio circuitry 110 also includes a headset jack (not shown). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as a touch-sensitive display 112 and other input/control devices 116, to peripherals interface 118. I/O subsystem 106 may include display controller 156 and one or more input controllers 160 for other input or control devices 116. One or more input controllers 160 receive/send electrical signals from/to other input or control devices 116. Other input/control devices 116 may include physical buttons (e.g., push buttons, rocker buttons, etc.), dials, slider switches, joysticks, click wheels, and so forth. In some arrangements, input controller(s) 160 are coupled to any (or none) of the following: a keyboard, infrared port, USB port, and a pointer device such as a mouse. One or more buttons may include an up/down button for volume control of speaker 111 and/or microphone 113. One or more buttons may include a push button. A quick press of the push button may disengage a lock of touch screen 112 or begin a process that uses gestures on the touch screen to unlock the device. A longer press of push button may turn power to device 100 on or off. The user may be able to customize a functionality of one or more of the buttons. Touch screen 112 is used to implement virtual or soft buttons and one or more soft keyboards.

Touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some of the example embodiments, some or all of the visual output may correspond to user-interface objects, further details of which are described below.

Touch screen 112 has a touch-sensitive surface, sensor or set of sensors that accept input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on the touch screen. A point of contact between touch screen 112 and the user may correspond to a finger of the user, for example.

Touch screen 112 may use LCD (liquid crystal display) technology, or LPD (light emitting polymer display) technology, although other display technologies may be used in other configurations. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. The user may make contact with touch screen 112 using any suitable object or appendage, such as a stylus, a finger, and so forth. In some configurations, a user interface displayed on touch screen 112 is designed to work primarily with finger-based contacts and gestures, which are much less precise than stylus-based input due to the larger area of contact of a finger on the touch screen. In some configurations, the device translates the rough finger-based input into a precise pointer/cursor position or command for performing the actions desired by the user. In some configurations, in addition to or instead of touch screen, device 100 may include a touchpad (not shown) for activating or deactivating particular functions. In some configurations, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes a power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more proximity sensors 166. FIG. 1 shows proximity sensor 166 coupled to peripherals interface 118. Alternately, proximity sensor 166 may be coupled to input controller 160 in I/O subsystem 106. In some configurations, proximity sensor 166 turns off and disables the touch screen 112 when the multifunction device is placed near the user's ear (e.g., when the user is making a phone call). In some configurations, the proximity sensor keeps the screen off when the device is in the user's pocket, purse, or other dark area to prevent unnecessary battery drainage when the device is a locked state.

Device 100 may also include one or more accelerometers 168. FIG. 1 shows an accelerometer 168 coupled to peripherals interface 118. Alternately, the accelerometer 168 may be coupled to input controller 160 in the I/O subsystem 106. In some configurations, information is displayed on touch screen display 112 in a portrait view or a landscape view based on an analysis of data received from one or more accelerometers 168.

Device 100 may also include one or more optical sensors 164. FIG. 1 shows an optical sensor coupled to an optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with a camera module 133, optical sensor 164 may capture still images or video. In some configurations, an optical sensor is located on the back of device 100, opposite touch screen 112 on the front of the device, so that the touch screen display may be used as a viewfinder for either still and/or video image acquisition. In some configurations, an optical sensor is located on the front of the device so that user's image may be obtained for videoconferencing while the user views the other video conference participants on the touch screen display. In some configurations, the position of optical sensor 164 can be changed by the user (e.g., by rotating the lens and the sensor in the device housing) so that a single optical sensor 164 may be used along with the touch screen display for both video conferencing and still and/or video image acquisition.

In some configurations, the software components stored in memory 102 may include an operating system 126, a communication module (or set of instructions) 127, a contact/motion module (or set of instructions) 128, a graphics module (or set of instructions) 129, a text input module (or set of instructions) 130, a location module (or set of instructions) 131, a location database 132, and a camera module (or set of instructions) 133, among other modules.

The operating system 126 (e.g., APPLE IOS, WINDOWS PHONE, ANDROID, PALM WEBOS, SYMBIAN, WINDOWS MOBILE, BLACKBERRY OS, or other operating system) includes various software components and/or drivers for controlling and managing general system tasks (e.g., memory management, storage device control, power management, etc.) and facilitates communication between various hardware and software components.

Communication module 127 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.).

Contact/motion module 128 may detect contact with touch screen 112 (in conjunction with display controller 156) and other touch sensitive devices (e.g., a touchpad or click wheel). Contact/motion module 128 includes various software components for performing various operations related to detection of contact, such as determining if contact has occurred, determining if there is movement of the contact and tracking the movement across touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some configurations, contact/motion module 128 and display controller 156 also detects contact on a touchpad. In some configurations, contact/motion module 128 and controller 160 detects contact on a click wheel.

Graphics module 129 includes various known software components for rendering and displaying graphics on touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

Text input module 130, which may be a component of graphics module 129, provides soft keyboards for entering text in various applications (e.g., a contacts list application, an e-mail application, an instant messaging application, a blogging application, a web browser application, and any other application that needs text input).

Location module 131 determines the location of the device and provides this information for use in various applications (e.g., to camera module 133 as picture/video metadata). For example, location module 131 can be a geographical positioning system (GPS) that receives signals from Earth-orbiting satellites to determine current geographic position of device 100. Alternatively, location module 131 can be a positioning system that communicates with a network communications system or any other system for determining the physical location or position of device 100.

Location database 132 may also be stored in memory 102. Location database 132 can associate location information with geographic coordinates. Geographic coordinates obtained from location module 131 can be used as lookup keys to the location database to obtain location information associated with the geographic coordinates. The location information may include, but is not limited to, maps or addresses or any other information useful to associate with geographic coordinates. Lookups in location database 132 may not require an exact match between geographic coordinates provided as a key and geographical coordinates in location database 132 associated with location information. Instead, it may be possible to obtain location information for a given coordinates from location database 132 by determining the geographic coordinates or set of coordinates in location database 132 that are geographically near or nearest the given coordinates.

Camera module 133 may be used to capture still digital images or video (including a digital video stream) from optical sensor(s) 164 and optical sensor controller 158 and store them in memory 102. Images and video captured by the camera module 133 may be stored in 102 memory in a well-known lossy or lossless encoding format such as, for example, the Portable Network Graphics (PNG) format, the Joint Photographic Experts Group (JPG) format, of the Tagged Image File Format (TIFF) for images, and the motion pictures experts group (MPEG) format for video. The camera module 133, in conjunction with an optical sensor 1 64 and optical sensor controller 158, may provide other camera-related features such as exposure control, face detection, image and video stabilization, auto-focus, etc.

The on-device index 134 indexes mobile content accessible by users using mobile applications 137 and 138. When indexed in on-device index 134, mobile content is sometimes referred to a searchable item because it can be searched for by a user using search module 136. A searchable item is represented in the on-device index 134 by an index entry. An index entry in the on-device index 134 for a searchable item may have all of the following properties, or a subset or superset thereof:
  a unique identifier,
  a domain identifier,
  an attributes set, and
  an expiration date.

The unique identifier of an index entry uniquely identifies a searchable item within a mobile application (e.g., 137). The domain identifier of an index entry represents a domain or owner of the searchable item. The attribute set of an index entry contains metadata about a searchable item. The expiration date of an index entry is a date and/or time after which the index entry should no longer exist in the on-device index 134.

The on-device index manager 135 offers an application programming interface (API) to mobile applications (e.g., 137) for managing on-device index 134. The API may allow a mobile application to perform all of the following operations, or a subset or a superset thereof:
  add or update an index entry for a searchable item in the on-device index 134, and
  delete or remove an index entry for a searchable item in the on-device index 134.

The search module 136 provides a user the ability to keyword search for searchable items indexed in the on-device index 134. The search module 136, in conjunction with touch screen 112, display controller 156, and graphics module 129, provides a user interface that can be launched by the user.

Once launched, the user can input a search query. The search query may comprise one or more keywords (i.e., sequences of characters). A keyword may be input by the user in various different ways. For example, a keyword may be input using a soft keyboard presented on the touch screen 112, or by being spoken by the user into the microphone 113. After entering the search query, the user may initiate the search through the user interface (e.g., by activating a search button).

Once initiated, the search module 136 consults the on-device index 134 to determine searchable items that satisfy the search query. Searchable items that satisfy the search query are presented as search results in the user interface. A search result corresponds to a searchable item. User activation of a search result causes the search module 136 to message (e.g. callback) the corresponding mobile application (i.e., the mobile application by which the searchable item is accessible), passing an identifier of the searchable item represented by the search result in the message. The mobile application can then take some action on the searchable item represented by the search result. For example, if a search result represents a mobile application installed on the device 100 (i.e., the searchable item is the mobile application), then activating the search result may launch the mobile application for the user. As another example, a search result may represent a user's prior dinner reservation at a restaurant and activating the search result may launch a mobile application for making a new reservation at the same restaurant.

The content management application 137 allows a user to perform various actions with content items hosted with a content management service. A content item is a logical collection of information under management of the content management service. When stored at a user's personal computing device (e.g., device 100), a content item is often stored as a file or folder in a file system. When stored on servers operated by the content management service, a content item may be stored as a file or folder in a file system. Alternatively, a content item may be stored as a set of one or more data blocks and associated metadata stored on servers operated by the content management service. The associated metadata for a content item managed by the content management service may include all of the following attributes of the content item, or a subset or a superset thereof:
  a content item identifier,
  a content item namespace identifier,
  a path,
  a block list,
  a type identifier, and
  a cursor value.

The content item identifier uniquely identifies the content item within the content management service. The content item namespace identifier uniquely identifies, within the content management service, a content item namespace to which the content item belongs. A content item namespace is a set of one or more related content items. For example, a set of content item associated with a user's account held with the content management service may be one content item namespace. A set of content items shared among (collaborated upon) multiple users of the service may be another content item namespace, as another example. The path encompasses a relative file system path for the content item. The path is relative to a file system mount point of the content item namespace to which the content item belongs. The mount point of the content item namespace may vary from user device to user device. For example, the mount point at device 100 for a content item namespace might be "/usr/bob/mydropbox" and the path for a content item that belongs to that content item namespace might be "/sales/Q1/projections.xls". In this case, the fully qualified path to the content item at device 100 is "/usr/bob/mydropbox/sales/Q1/projections.xls." The block list is a list of one or more identifiers of blocks that make up the content item. In some implementations, an identifier in the block list is computed by applying a cryptographic hash function (e.g., SHA-256) to the block. The type identifier identifies the content type of the content item. For example, the type identifier may identify an image file type (e.g., .jpg, .tiff, .gif, .png), a music file type (e.g., .mp3, .aiff, .m4a, .wav), a movie file type (e.g., .mov, .mp4, .m4v), a word processing file type (e.g., .doc, .docx, .pages), a presentation file type (e.g., .ppt, .pptx, .key), a spreadsheet file type (e.g., .xls., .xlsx, .numbers), a web page file type (e.g., .htm, .html), a text file types (e.g., .txt), or other file type. The cursor value is the value of a monotonically increasing logical clock (cursor). The cursor value reflects a point in time when the content item was committed to the content management service. In some implementations, each content item namespace under management of the content management service has its own cursor. In this case, cursor values are content item namespace specific. In some implementations, cursor values provide a total ordering of content items within a domain (e.g., a content item namespace) to which the cursor applies.

The content management application 137 may offer various features to a user for managing content items hosted with the content management service. Some of the features are described below and illustrated with respect to FIGS. 3-8 According to some of the example embodiments of the present invention, activation of some of the features by the user are detected by the content management application 137 as an indexing event. Detection of an indexing event may cause the content management application 137 to perform an on-device index maintenance operation on the on-device index 134. Generally, an indexing event can indicate that a content item should be made searchable (i.e., indexed) in the on-device index 134 or indicate that a content item should no longer be made searchable (i.e., de-indexed) in the on-device index 134. Example indexing events detected by the content management application 137 and consequent on-device index maintenance operations performed by the content management application 137 are described in greater detail below.

Other applications 138 may include the following, or a subset or a superset thereof: a telephone application, a video-conferencing application, an e-mail client application, an instant messaging application, a music player application, a web browser application, a calendar application etc.

The above-described basic computer hardware and software is presented for purpose of illustrating the basic underlying computer components that may be employed for implementing the example embodiments. The example embodiments, however, are not necessarily limited to any particular computing environment or computing device configuration. Instead, the example embodiments may be implemented in any type of system architecture or processing environment that one skilled in the art, in light of this disclosure, would understand as capable of supporting the features and functions of the example embodiments presented herein.

Exemplary Graphical User Interfaces

Attention is now directed towards example embodiments of user interfaces ("UI") and associated processes that may be implemented on device 100.

Figure 2:
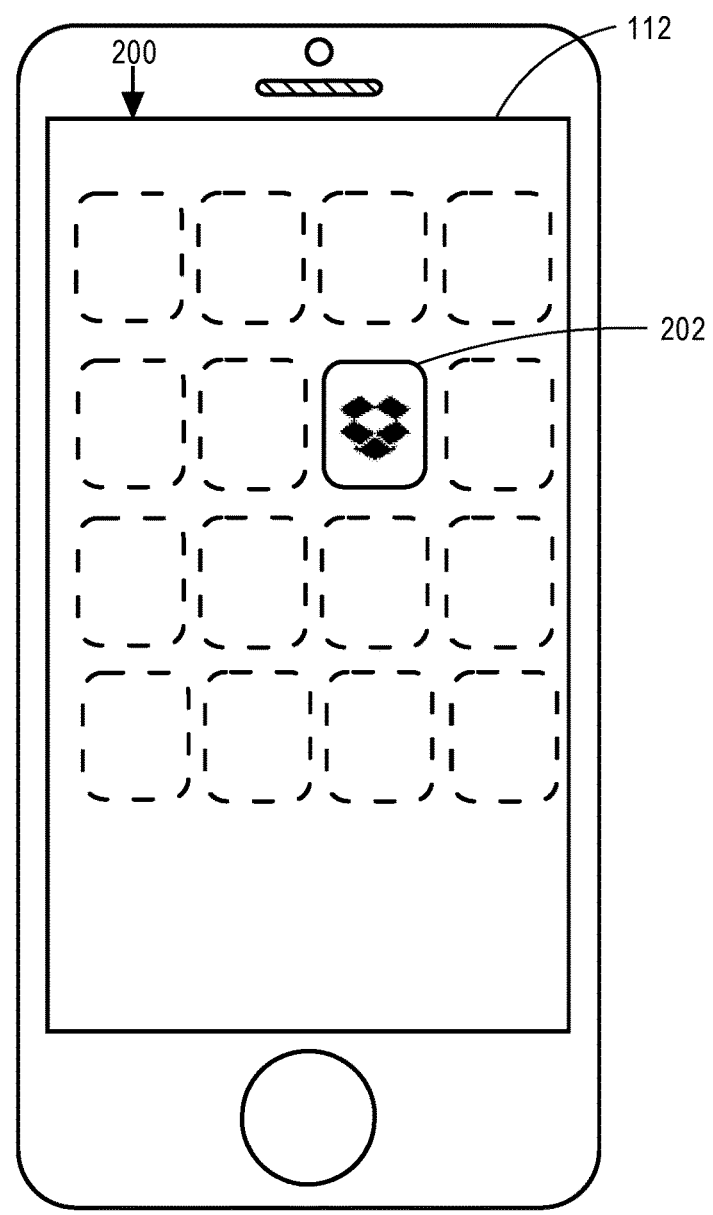
FIG. 2 illustrates an external view of the device, in accordance with some example embodiments of the present invention.

FIG. 2 illustrates an external view of device 100 having touch screen 112 in accordance with some example embodiments of the present invention. The touch screen 112 presents an exemplary UI 200 for launching the content management application 137. In particular, the UI 200 includes a number of icons arranged in a grid pattern including icon 202 for launching the content management application 137. Activating the icon 202 with a touch gesture (e.g., a tap, a press and hold, a double tap, etc.) directed to touch screen 112 or other user input (e.g., speech input) launches the content management application 137.

Figure 3:
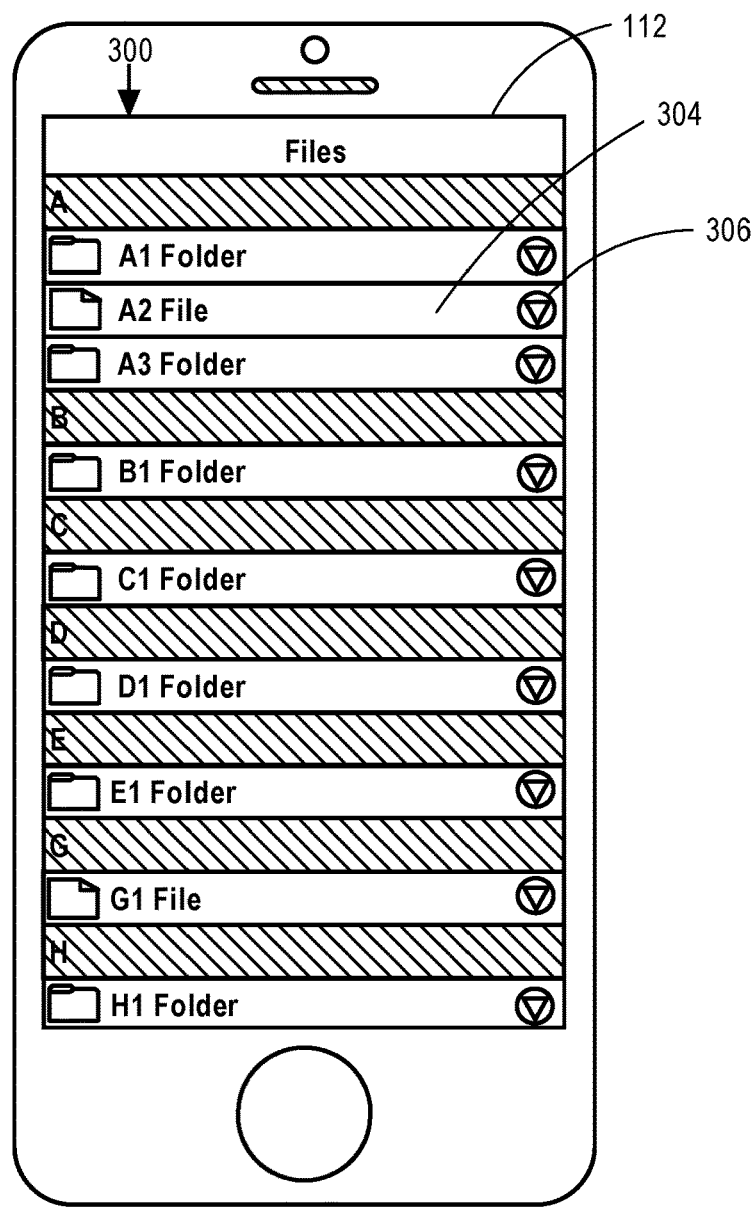
FIG. 3 illustrates an exemplary user interface that may be displayed on the touch screen of the device after a content management application is launched, in accordance with some example embodiments of the present invention.

FIG. 3 illustrates an exemplary UI 300 that may be displayed after the content management application 137 is launched in accordance with some example embodiments of the present invention. The user interface 300 displays a scrollable list of content items hosted with the content management service. The listed content items could be for content items from a set of content items associated with a user's account held with the content management service, for example. The content items are listed in alphabetical order in this example but could instead be listed in some other order (e.g., chronological) according to the requirements of the particular implementation at hand.

Viewing a Content Item

There are two types of content items shown in UI 300: folders and files. The type of content item, file or folder, is indicated with a corresponding icon next to the content item name. For example, a folder icon is displayed next to the content item name "A1 Folder" to indicate that the corresponding content item is a folder content item while a document icon is displayed next to the content item name "A2 File" to indicate that the corresponding content item is a file content item. The names of the file and folder content items shown in UI 300 are merely exemplary. In a practical embodiment, the names may be something more descriptive and useful to the user. For example, instead of "A1 Folder", the folder content item might be named "My Christmas Photos" and instead of "A2 File", the file content item might be named "Q1 Sales Projections.xls".

Activating a file or folder listing in the UI 300 with a touch gesture (e.g., tap, press and hold, double tap, etc.) directed to touch screen 112 or other user input allows the user to view the corresponding content item. If the content item is a folder content item, then another user interface similar to UI 300 is presented on the touch screen 112 that lists the file content items and/or folder content items, if any, in the selected folder content item. Thus, folder content items associated with a user's account held with the content management service can be nested to form a hierarchical file-folder content item hierarchy akin to a file system file-folder hierarchy found in many conventional operating systems.

Figure 4:
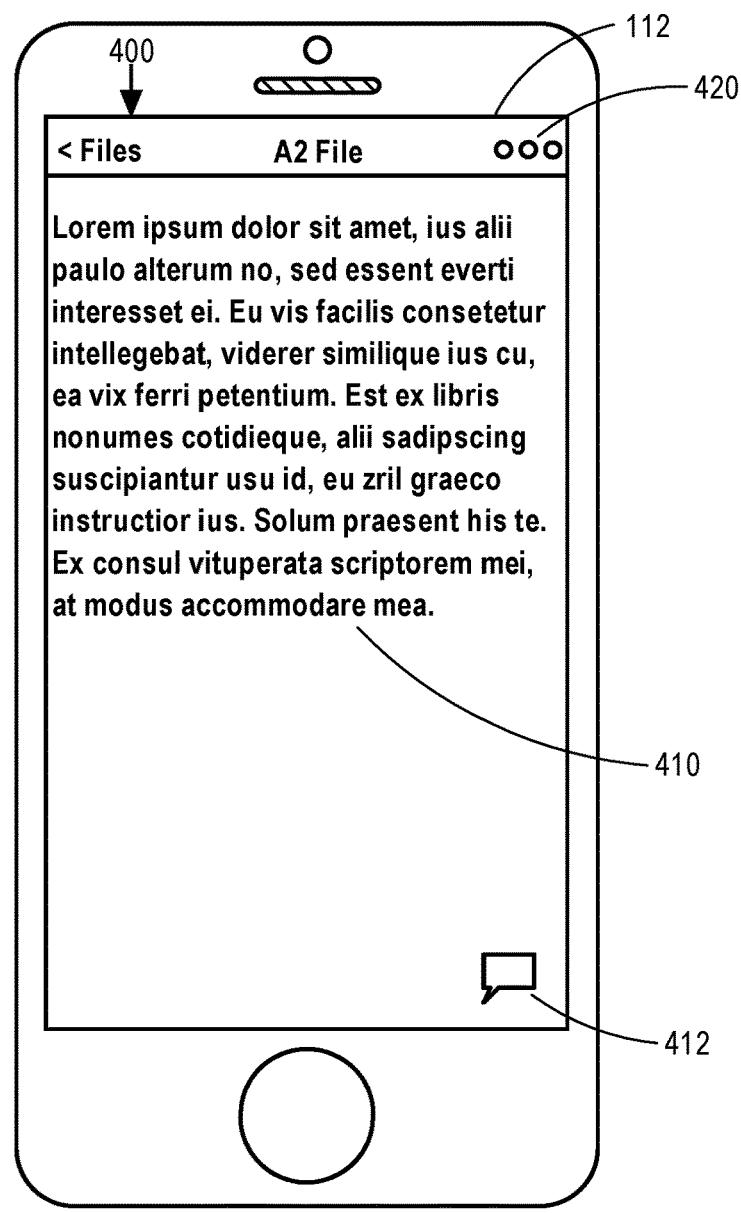
FIG. 4 illustrates an exemplary user interface that may be displayed on the touch screen of the device after the user selects a file content item listing selectable item presented in the exemplary user interface of FIG. 3, in accordance with some example embodiments of the present invention.

FIG. 4 illustrates an exemplary UI 400 that may be displayed on touch screen 112 after the user selects the file content item listing selectable item 304 presented in UI 300 with a user input (e.g., a touch gesture). The user may make this selection in order to view the contents of the "A2 File" content item. User interface 400 displays contents 410 of the selected "A2 File" content item. In this example, the document type of the "A2 File" content item is a text document. Accordingly, text content 410 of the content item is displayed in user interface 410. Different types of content may be displayed depending on the document type of the file content item. For example, if "A2 File" were an image content item, then the content 410 displayed may be the digital image. Or if "A2 File" were a movie or audio file content item, then content 410 may include user interface controls for the user to being playback of the move or audio content item.

According to some example embodiments of the present invention, viewing a file or folder content item in the content management application 137 is detected by the content management application 137 as an indexing event. After detecting the indexing event, an index entry is then added for the viewed content item to the on-device index 134, if the index entry does not already exist in the on-device index 134.

According to some example embodiments, the content management application 137 adds an index entry to the on-device index 134 only for viewed file content items, and not viewed folder content items, on the expectation that when a user uses the search module 136 to search for content items, the user is more interested in content item files that match the search query than content item folders that match the search query. According to some example embodiments, the content management application 137 adds an index entry to the on-device index 134 from some types of viewed folder content items but not for other types of viewed folder content items. For example, the content management application 137 may add an index entry to the on-device index 134 for a viewed folder content item when that folder content item is a "shared folder". A shared folder, in the context of the content management service, is a folder content item that is accessible to a specified set of more than one user of the content management service, as opposed to being accessible only to a single user of the content management service. For example, a shared folder may be accessible by members of a team of users, such as a sales, marketing, or accounting team. Metadata may be stored at device 100 accessible to content management application 137 indicating whether or not a particular folder content item is a shared folder.

Commenting on a Content Item

User interface 400 also includes commenting controls 412 which may be activated by the user with user input (e.g., a touch gesture). Commenting controls 412 allow the user to start a discussion or leave feedback with other users of the content management service regarding the "A2 File" content item. The comments associated with a content item may be organized in a thread allowing users to reply to earlier comments in the thread.

Figure 5:
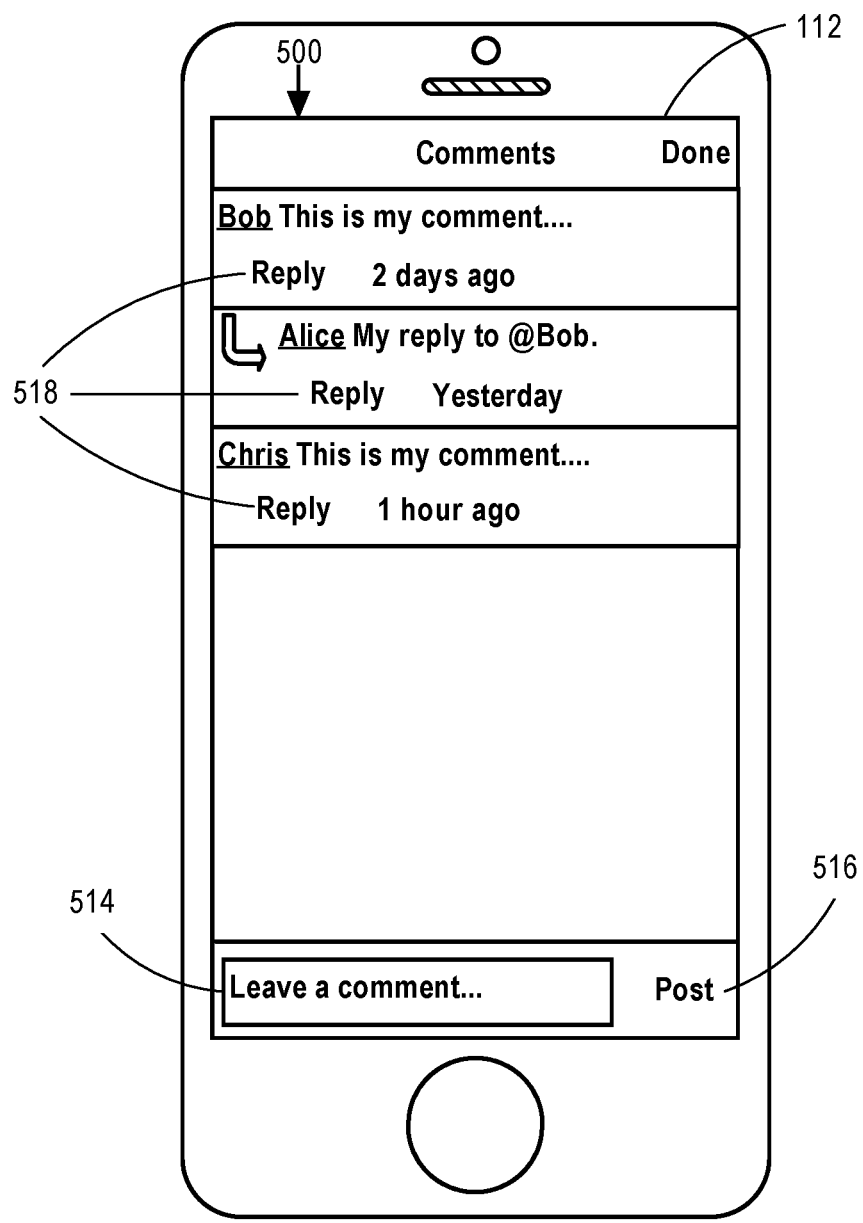
FIG. 5 illustrates an exemplary user interface that may be displayed on the touch screen of the device in response to a user activating commenting controls in the exemplary user interface of FIG. 4, in accordance with some example embodiments of the present invention.

FIG. 5 illustrates an exemplary user interface 500 that may be displayed on the touch screen 112 in response to the user activating commenting controls 412. UI 500 includes comment entry controls 514 and comment post controls 516. The user may provide a new comment on the "A2 File" via comment entry controls 514, for example, by selecting keys on a soft keyboard presented on touch screen 112 or by voice input to microphone 113 which is then translated to text by a speech-to-text module of the device 100. Once the user has provided the comment, the user may post the comment by activating post controls 516. Alternatively, the user can similarly reply to an existing comment by activating the reply controls 418 associated with the existing comment to which the user wishes to reply.

According to some example embodiments of the present invention, when the user posts a comment about a content item, it is detected as an indexing event by the content management application 137. After detecting the indexing event, an index entry is then added for the content item to the on-device index 134, if the index entry does not already exist in the on-device index 134. According to some example embodiments, when the user posts a reply comment to an existing comment about a content item, it is detected as an indexing event by the content management application 137. After detecting the indexing event, an index entry is then added for the content item to the on-device index 134, if the index entry does not already exist in the on-device index 134.

Other Content Item Actions

Figure 6:
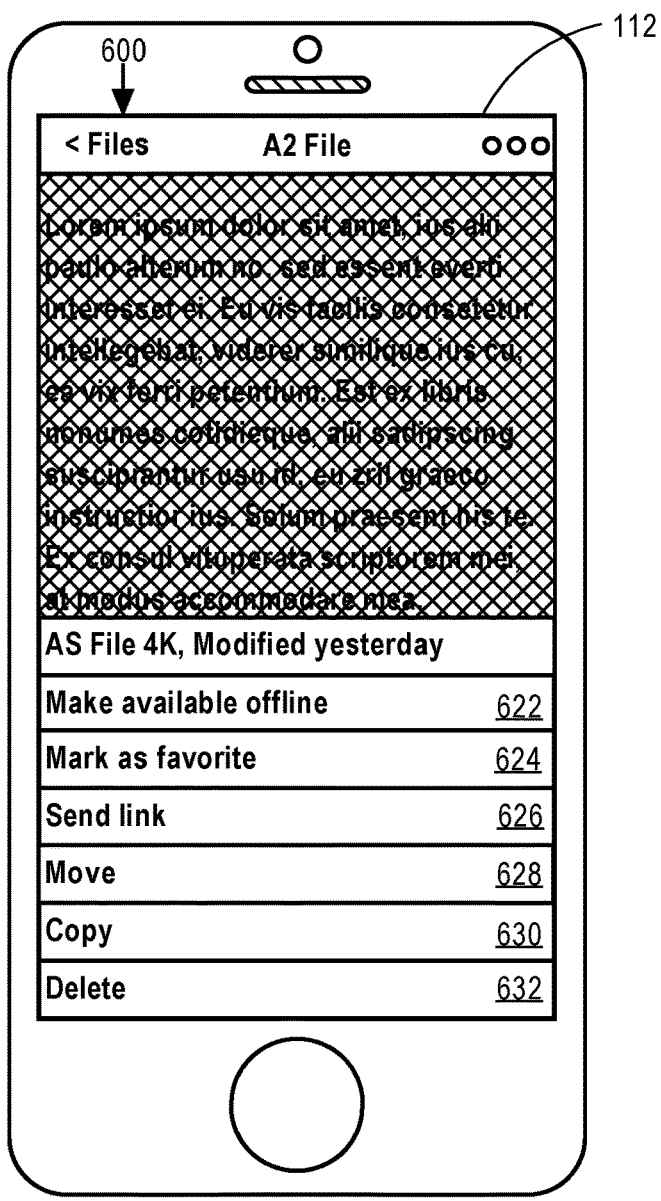
FIG. 6 illustrates an exemplary user interface that may be displayed on the touch screen of the device after the user activates controls for a file content item in the exemplary user interface of FIG. 5, in accordance with some example embodiments of the present invention.

Returning to briefly to FIG. 4, UI 400 may include other user interface controls 420 available to the user to perform other actions with respect to the "A2 File" content item. These controls 420 may also correspond to user interface controls 306. In particular, activating controls 420 (or 306) may cause a menu with selectable menu items to be displayed on the touch screen 112 such as the menu shown in FIG. 6. In particular, FIG. 6 illustrates an exemplary UI 600 after the user activates controls 420 of UI 400. The activation causes a menu to be displayed on the touch screen 112 with a number of selectable menu items 622, 624, 626, 628, 630, and 632.

Offline Access

The "Make available offline" menu item 622, if activated by user input (e.g., a touch gesture), causes a copy of the "A2 File" content item to be stored at the device 100. If necessary, the content item (or the content item block(s) that make up the content item) is downloaded by the device 100 over a network (e.g., the Internet) from server(s) managed by the content management service. By doing so, the content item can be viewed at the device 100 using the content management application 137 even when the device 100 does not have network (e.g., Internet) connectivity with the content management service. Activating the "Make available offline" menu item 622, in addition to causing a copy of the content item to be stored locally at the device 100, sets metadata stored at the device 100 associated with content item to indicate that the content item is now configured for offline access.

If, instead, when the user activates controls 420 of UI 400, metadata stored at the device 100 associated with the "A2 File" content item indicates that the content item is already configured for offline access (e.g., the "Make available offline" menu item 622 was previously selected for the content item), then, instead of presenting a "Make available offline" menu item 622 in GUI 600, a "Remove from device" menu item may be displayed. In this case, activating the "Remove from device" menu item causes the copy of the content item to be removed (deleted) from the device 100. Additionally, the metadata stored at the device 100 associated with "A2 File" content item is updated or deleted to indicate that the content item is no longer configured for offline access.

According to some example embodiments of the present invention, an indexing event is detected by the content management application 137 when the user configures a content item for offline access (e.g., by selecting a "Make available offline" menu item for the content item). After detecting the indexing event, an index entry is then added for the content item to the on-device index 134, if the index entry does not already exist in the on-device index 134. According to some example embodiments of the present invention, an indexing event is detected by the content management application 137 when the user de-configures a content item for offline access (e.g., by selecting a "Remove from device" menu item for the content item when the content item is currently configured by offline access). After detecting the indexing event, the index entry for the content item is removed from the on-device index 134, if the index entry currently exists in the on-device index 134.

Favorites

The "Mark as favorite" menu item 624, if activated by user input (e.g., a touch gesture), causes metadata stored locally at device 100 and associated with the "A2 File" content item to indicate that the content item is a favorite, important, or significant to the user. Such metadata may also be used when presenting a list of content items (e.g., as in GUI 300) to indicate which of the listed content items are favorites. For example, a star or other icon may be displayed next to a listing of a favorite content item.

If, instead, when the user activates controls 420 of UI 400, metadata stored at the device 100 associated with the "A2 File" content item indicates that the content item is already marked as a favorite of the user (e.g., the "Mark as favorite" menu item 624 was previously selected by the user for the content item), then, instead of presenting a "Mark as favorite" menu item 624 in GUI 600, a "Remove from favorites" menu item may be displayed. In this case, activating the "Remove from favorites" menu item causes the metadata stored at the device 100 associated with "A2 File" content item to be updated or deleted to indicate that the content item is no longer one of the user's favorites.

According to some example embodiments of the present invention, an indexing event is detected by the content management application 137 when the user marks a content item as a favorite (e.g., by selecting a "Make as favorite" menu item for the content item). After detecting the indexing event, an index entry is then added for the content item to the on-device index 134, if the index entry does not already exist in the on-device index 134. According to some example embodiments of the present invention, an indexing event is detected by the content management application 137 when the user removes a content item from the user's favorite content items (e.g., by selecting a "Remove from favorites" menu item for the content item when the content item is currently marked as a favorite of the user). After detecting the indexing event, the index entry for the content item is removed from the on-device index 134, if the index entry currently exists in the on-device index 134.

Sending a Link

The "send link" menu item 626 allows the user to generate a "shared link" to the "A2 File" content item that can then by shared with one or more other users of the content management service. A shared link is a Uniform Resource Identifier (URI) that identifies a particular content item hosted with the content management service. A shared link may be submitted to a server operated by the content management service in the form of a Uniform Resource Locator (URL) to access to the referenced content item (e.g., download it for display in by requestor's user-agent (e.g., web browser)).

Upon activating the send link menu item 626, the device 100 sends a network request to a server operated by the content management service requesting the server to generate a shared link for the "A2 File" content item. After generating the shared link, it is returned to the device 100 by the server in a network response to the network request. After receiving the shared link from the content management service, further user interfaces may be presented to the user at device 100 on touch screen 112 with controls that allow the user to send the generated shared link in the form of a URL to one or more other users of the content management service. For example, the URL can be sent to other users in an e-mail message, a text message, posted on the user's news feed provided by a social networking web site, etc. Users receiving the URL can submit the URL to a content management service server to access the "A2 File" content item in some way (e.g., view it or download it), provided the users have the appropriate permissions to do so.

According to some example embodiments of the present invention, an indexing event is detected by the content management application 137 when a shared link is generated for a content item and received from the content management service (e.g., after selecting a "send link" menu item for the content item). After detecting the indexing event, an index entry is then added for the content item to the on-device index 134, if the index entry does not already exist in the on-device index 134.

Moving or Copying

The "Move" menu item 628 or the "Copy" menu item 630 may be activated by the user to move or copy, respectively, the "A2 File" content item from the current folder content item in which the "A2 File" is contained to another folder content item associated with the user's account held with the content management service. After activating the Move menu item 628 or the Copy menu 630, the user may be presented with another user interface for selecting a target folder content item for the move or copy operation. Once the target folder content item is selected, the content management application 137 sends a network request move or copy the content item to the target folder content item.

According to some example embodiments of the present invention, an indexing event is detected by the content management application 137 when a content item is moved or copied. For example, an indexing event for a moved or copied content item may be detected by the content management application 137 after receiving a network response from a content management service server indicating that the requested move or copy operation was successfully performed. After detecting the indexing event, an index entry is then added for the content item to the on-device index 134, if the index entry does not already exist in the on-device index 134.

Deleting

The "Delete" menu item 632 may be activated by the user to delete or remove the "A2 File" content item from the set of content items associated with the user's account held with the content management service. After activating the Delete menu item 632, the user may be presented with another user interface and associated controls for the user to confirm that requested delete operation be performed, in case the user accidentally activated the "Delete" menu item 632. After the user confirms the delete option, the content management application 137 sends a network request delete the content item.

According to some example embodiments of the present invention, an indexing event is detected by the content management application 137 when a content item is deleted. For example, an indexing event for a deleted content item may be detected by the content management application 137 after receiving a network response from a content management service server indicating that the requested delete operation was successfully performed. After detecting the indexing event, the index entry for the deleted content item is removed from the on-device index 134, if the index entry currently exists in the on-device index 134.

Inviting Shared Folder Collaboration

Figure 7:
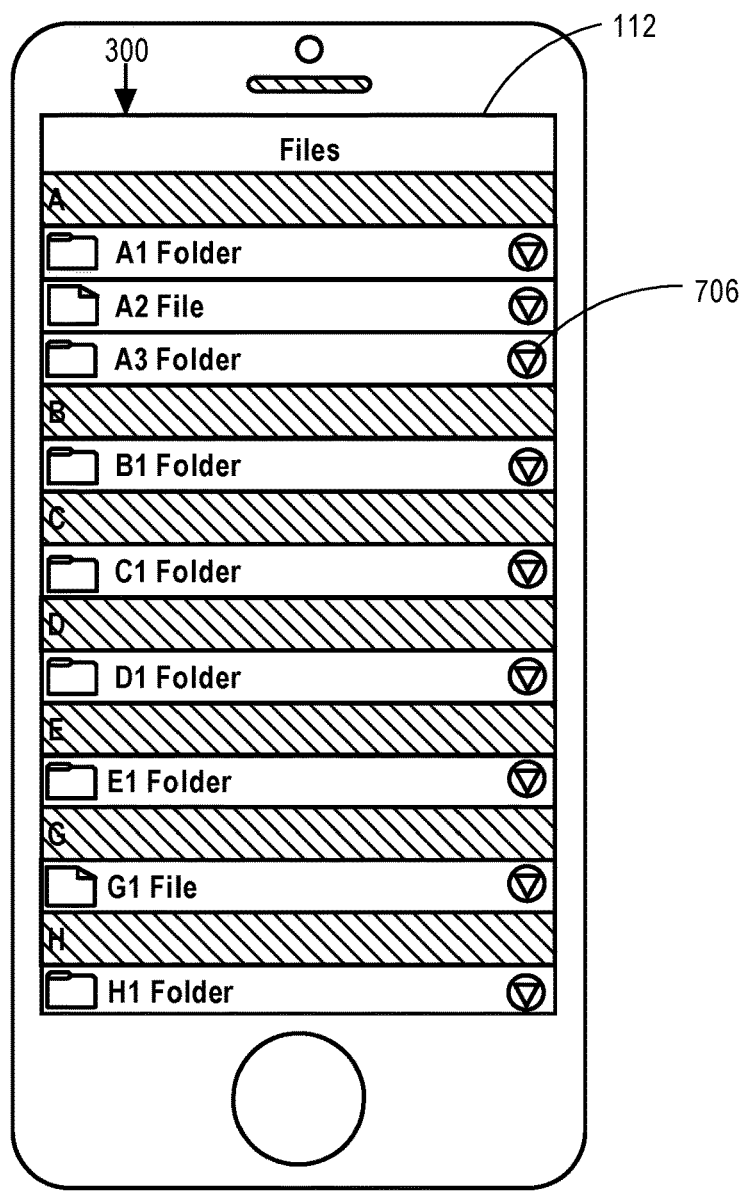
FIG. 7 illustrates an exemplary user interface of the content management application that may be displayed on the touch screen of the device, in accordance with some example embodiments of the present invention.
Figure 8:
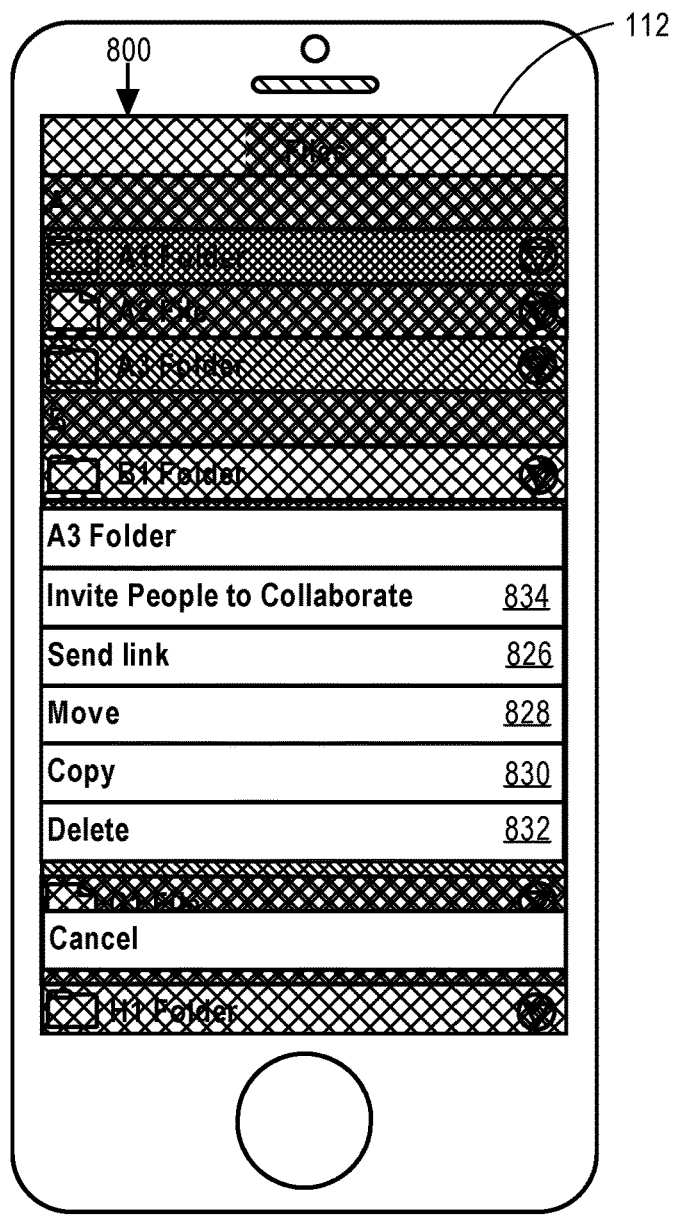
FIG. 8 illustrates an exemplary user interface that may be displayed on the touch screen of the device after the user activates controls for a folder content item in the exemplary user interface of FIG. 7, in accordance with some example embodiments of the present invention.

FIG. 7 illustrates UI 300 of FIG. 3. UI 300 provides user interface controls 706 for performing various actions on the "A3 Folder" content item. Controls 706 are like control 306 of FIG. 3, except that controls 706 are folder content item-specific controls while controls 306 are file content item-specific controls. Nonetheless, there is some overlap in the actions that can be performed on folder content items and the actions that can be performed on file content items as shown in UI 800 of FIG. 8, which illustrates a UI 800 providing controls 834, 826, 828, 830, 830, and 832 for performing various actions on the "A3 Folder" content item when compared to UI 600 of FIG. 6 which shows controls 622, 624, 626, 628, 630, and 632 for performing various actions on the "A2 File" content item. In particular, controls 626, 628, 630, and 632 for a file content item are analogous to controls 826, 828, 830, and 832 except to the extent the corresponding actions are performed differently for file content items than for folder content items.

UI 800 includes folder content item-specific controls 834 for inviting other users of the content management service to collaborate on the "A3 Folder". Such collaboration may include, depending on configured permissions and access controls, users viewing, downloading, editing, and commenting on file content items and folder content items contained in the shared folder.

Upon activating the "Invite People to Collaborate" menu item 834, another user interface may be presented on the touch screen 112 that prompts the user to enter identifiers of one or more other users to invite to collaborate on the "A3 Folder" with and to confirm the sending of invitations to the invitees. Upon receiving confirmation from the user to send the invitations, the content management application 137 sends a network request to a content management service server requesting that the "A3 Folder" be converted to a shared folder and that the invitations be sent to the invitees. The invitations may be sent to the invitees in various forms including by e-mail, for example. The invitation invites the invitee(s) to join the shared folder. In some cases, if an invitee accepts the invitation (e.g., by clicking on a URL provided in the invitation), a copy of the shared folder and its contents are downloaded from content management service server(s) to the invitee's personal electronic device (e.g., mobile phone or desktop computer). Thereafter, the copy of the shared folder and its contents are kept in synch via the content management service with other copies of the shared folder stored at other invitee's personal computers that also accepted the invitation.

According to some example embodiments of the present invention, an indexing event is detected by the content management application 137 when it receives confirmation of a successful conversion of a folder content item to a shared folder. For example, a network request may be sent by the content management application 137 to a content management service server to convert a particular folder content item to a shared folder after the user activates the "Invite People to Collaborate" menu item 834 for the particular folder content item. The content management application 137 may detect an indexing event based on receiving a network response to the network request from the content management service server that confirms the successful conversion. After detecting the indexing event, an index entry is then added for the content item to the on-device index 134, if the index entry does not already exist in the on-device index 134.

Search Interface

Figure 9:
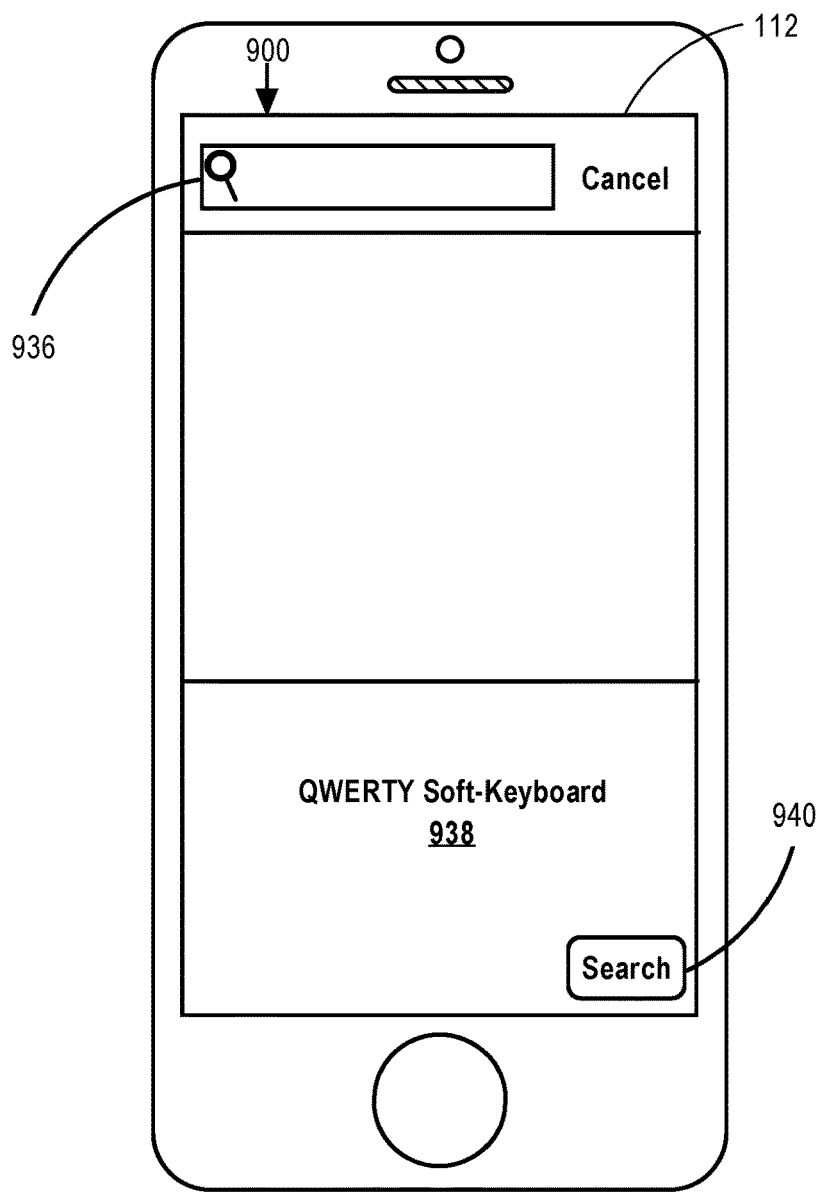
FIG. 9 illustrates an exemplary user interface that may be displayed on the touch screen of the device by a search module, in accordance with some example embodiments of the present invention.

FIG. 9 illustrates a UI 900 on touch screen 112 of device 100. UI 900 presents a search interface for the user to input a search query. The search interface may be provided by the search module 136 of the device 100. For example, UI 900 may be displayed in response to the user performing a swipe or flick touch gesture in a downward direction on the touch screen 112 when user interface 300 of FIG. 3 is displayed. The search interface includes a search query entry field 936, a QWERTY soft-keyboard 938 for entering a search query into the search query entry field 936, and a search button 940 for submitting the search query entered into the search query entry field 936 to the search module 136.

Figure 10:
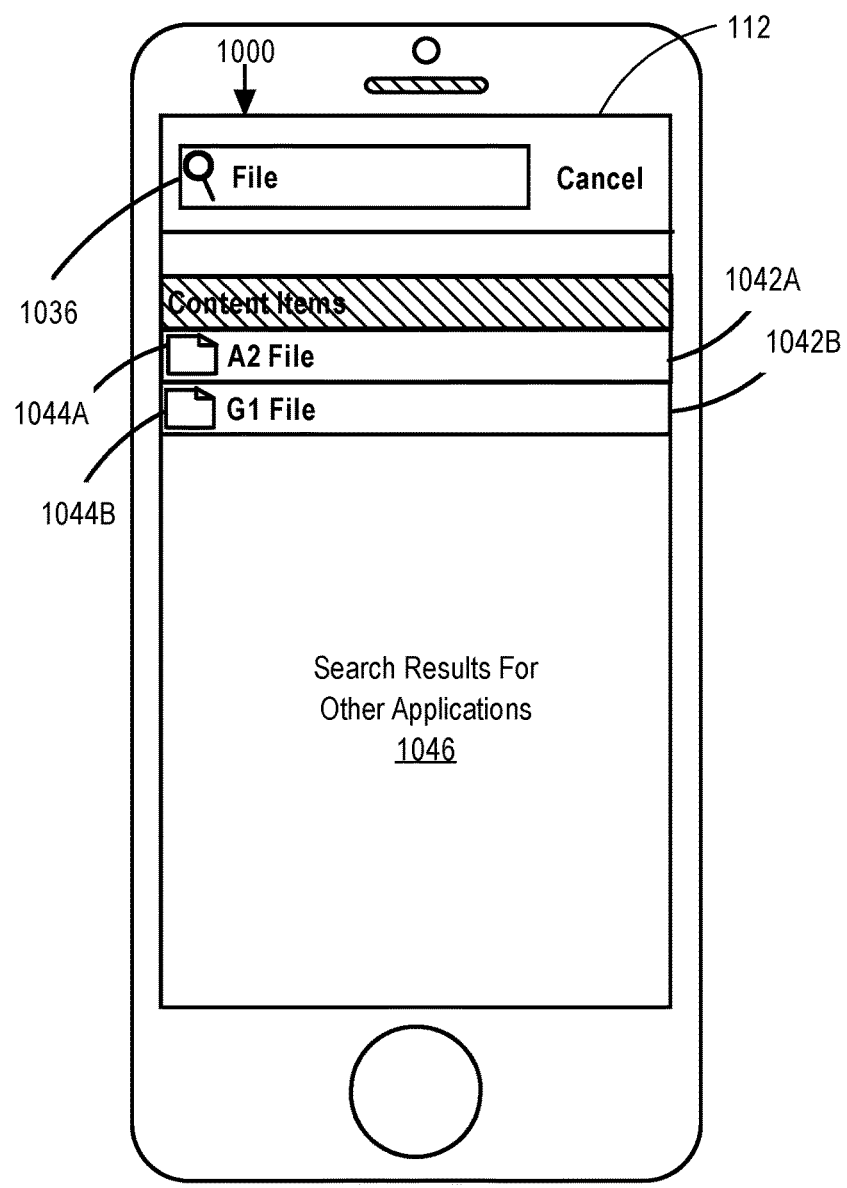
FIG. 10 illustrates an exemplary user interface that may be displayed on the touch screen of the device by the search module, in accordance with some example embodiments of the present invention.

FIG. 10 illustrates a UI 1000 presented on the touch screen 112 of device 100 in response to the user entering the search query "file" into the search query entry field 936 and activating the search button 940 in UI 900. UI 1000 presents search results to the search query include search results 1042. Search results 1042 are identified by the search module 136 using the input search query in the on-device index 134. Each search results 1042 corresponds to a searchable item that is accessible within the content management application 137. In particular search result 1042A corresponds to the "A2 File" content item and search result 1042B corresponds to the "G1 File" content item. The search results 1042 are presented in UI 1000 because their names contain the search query keyword "file". Each of the search results 1042 includes an icon or thumbnail image (e.g., 1044A, 1044B) that represents the corresponding content item. Each of the search results 1042 also includes the title or display name for the corresponding content item. Each of the search results 1042 may be interactive. In particular, the user may activate a search result corresponding to a content item. Activating a search result corresponding to a content item launches the content management application 137 so that the corresponding content item can be viewed within the content management application 137. For example, activating search result 1042A may cause a user interface similar to the user interface 400 of FIG. 4 to be displayed on the touch screen 112.

Read Surrogate Database

According to some example embodiments of the present invention, the content management application 137 maintains a separate database that is a read surrogate for the on-device index 134. This "read surrogate" database is separate in the sense that it is not shared with other applications 138 installed on the device 100 like the on-device index 134 is shared between applications installed on the device. Rather, the read surrogate database is accessed and maintained only by the content management application 137. A purpose of maintaining the read surrogate database is so that the content management application 137 can determine what content items are currently indexed in the on-device 134 and what content items are not currently indexed in the on-device 134 without requiring the capability to read from the on-device index 134, which may not be allowed by the API offered by the on-device index manager 135.

When the content item management application 137 detects an indexing event pertaining to a content item that indicates that an index entry for the content should be added to the on-device index 134 (e.g., when the content item is viewed in the content management application 137), the content item management application 137 checks for the existence in the read surrogate database for a proxy entry for the content item before attempting to add the index entry to the on-device index 134. If the proxy entry exists, then no attempt is made to add the index entry (although an attempt to update the index entry may in the on-device index 134 may be made).

When the content item management application 137 detects an indexing event pertaining to a content item that indicates that an index entry for the content item should be deleted or removed from the on-device 134 (e.g., when the content item is deleted in the content management application 137), the content item management application 137 checks for the existence in the read surrogate database for a proxy entry for the content item before attempting to delete the index entry from the on-device index 134. If the proxy entry does not exist, then no attempt is made to delete the index entry.

By maintaining the read surrogate database, the content management application 137, in addition to being able to determine which content items are currently indexed in the on-device index 134, can avoid unnecessarily consuming computing resources and battery power of device 100 by attempting to add an index entry for a content item that already exists in the on-device index 134 or by attempting to remove an index entry for a content item that does not exist in the on-device index 134.

Figure 11:
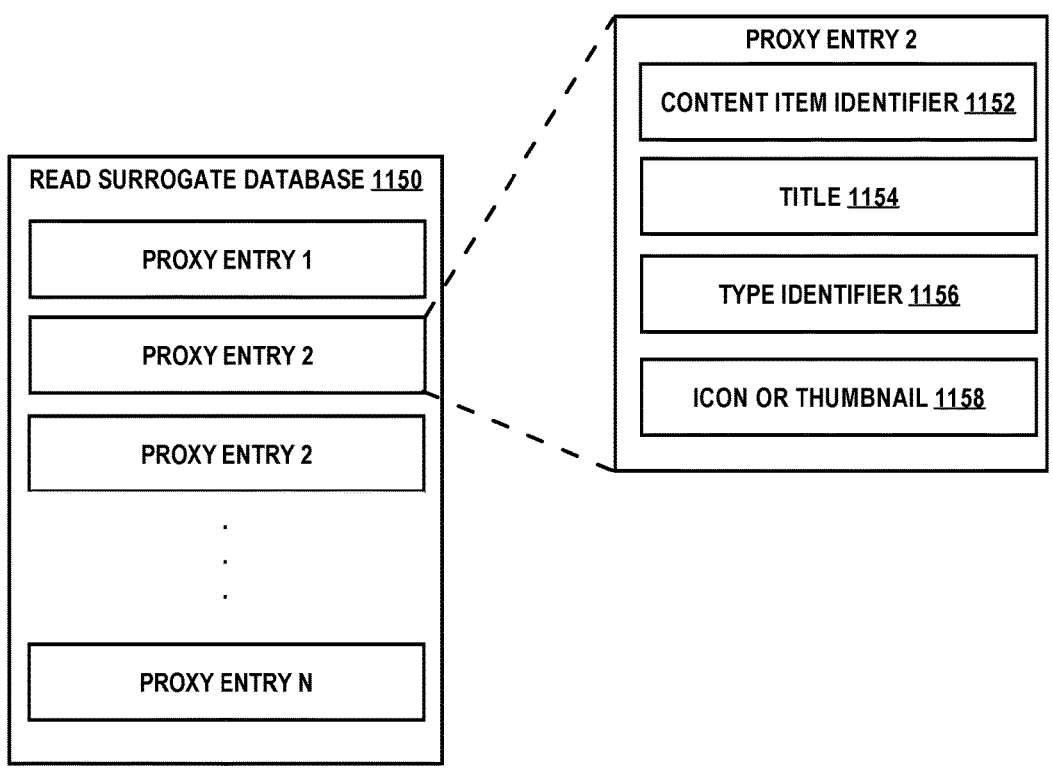
FIG. 11 illustrates a database maintained by the content management application that is a read surrogate for an on-device index, in accordance with some example embodiments of the present invention.

FIG. 11 illustrates the high-level structure of a read surrogate database 1150 that is maintained by the content management application 137, in accordance with some example embodiments of the present invention. The database 1150 may be persistently stored on the device 100 as one or more files in a file system provided by the operating system 126. When content management application 137 is launched and executing on device, some or all of the database 1150 may be stored in volatile memory of the device 100 for efficient access by the content management application 137.

The database 1150 comprises a number of proxy entries. Each proxy entry corresponds to an index entry in the on-device index 134. Each proxy entry may have all of the following properties, or a subset or a superset thereof:
 a content item identifier 1152,
 a title 1154,
 a type identifier 1156, and
 an icon or thumbnail image 1158.

The content item identifier 1152 identifies the content item that the proxy entry represents. The content item identifier 1152 also identifies the corresponding index entry in the on-device index 134. According to some example embodiments, the content item identifier 1152 is generated based on a combination of a user identifier and a path of the content item. For example, the user identifier and the path may each be character strings which are concatenated or combined and then a hash is computed from the combination and set as the content item identifier 1152. The title 1154 is a short text description of the corresponding content item. For example, the title 1154 can be the content item name. The type identifier 1156 identifies the content, file, or document type of the content item (e.g., text, image, video, audio, video, etc.). The icon or thumbnail image 1158 is an icon, graphic, or thumbnail image that represents the content item. All of the content item identifier 1152, the title 1154, the type identifier 1156, and the icon or thumbnail image 1158 may also be stored in the corresponding index entry in the on-device index 134.

Sample Operation

The following description presents method steps that may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for downloading and installation from an Internet location (e.g., Web server).

Figure 12:
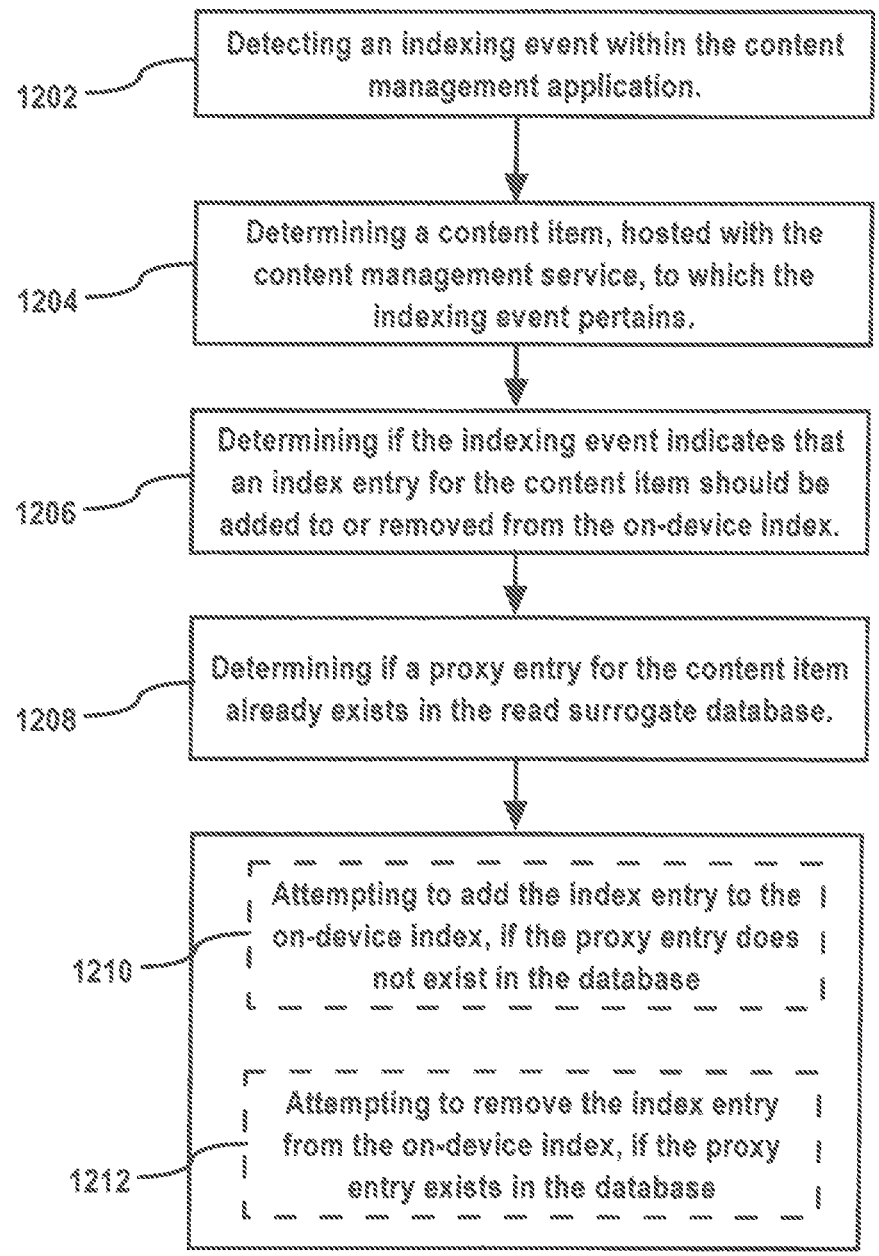
FIG. 12 is a flowchart illustrating operation of the content management application in performing a technique for on-device indexing of hosted content items, according to some example embodiments of the present invention.

FIG. 12 is a flowchart illustrating operation of the content management application 137 in performing a technique for on-device indexing of hosted content items, according to some example embodiments of the present invention. The operations are as follows.

At operation 1202, the content management application 137 detects an indexing event within the content management application 137. Detection may be made in response to detecting user input events or receiving network responses from the content management service indicating that the indexing event has occurred. According to some example embodiments, detection of an indexing event is made from an application event log maintained by the content management application 137. For example, a thread or sub-process of the content management application 137 can log various application events that occur within the application 137 such as when the user provides input to the application 137 or an action is taken by the application 137 in response to receiving a network response from the content management application 137. Indexing events may be detected by the same or another thread or sub-process that reads and analyzes application events logged in the application event log.

At operation 1204, the content item to which the indexing event pertains is determined. This determination may be made based on an identifier of and/or a local file system path to content item that is associated with the indexing event. For example, an application event logged in the application event log may include the identifier of and/or a local file system path to the content item to which the application event pertains.

At operation 1206, a determination is made whether an index entry for the content item should be added to or removed from the on-device index 134. This determination may be made based on the type of the indexing event. For example, if the type of the indexing event is viewing a content item in the content management application, then it may be determined to add an index entry for the content item to the on-device index 134. On the other hand, if the type of the indexing event is deleting a content item using the content management application, them it may be determined that an index entry for the content item should be removed from the on-index index 134.

At operation 1208, if an index entry for the content item should be added to or removed from the on-device index 134, then a determination is made whether a proxy entry for content item exists in the read surrogate database. This determination may be made based on an identifier for the content item. If a proxy entry for the content item does not exist in the read surrogate database and an index entry for the content item should be added to the on-device index 134, then at operation 210 an index entry for the content item is added to the on-device index 134. On the other hand, if a proxy entry for the content item exists in the read surrogate database and the index entry for the content item should be removed from the on-device index 134, then the index entry is removed from the on-device index 134.

Extensions and Alternatives

In the foregoing specification, example embodiments of the present invention have been described with reference to numerous specific details. However, the details may vary from implementation to implementation according to the requirements of the particular implement at hand. The example embodiments are, accordingly, to be regarded in an illustrative rather than a restrictive sense.

The invention claimed is:

1. A method, comprising:
at a portable electronic device comprising one or more processors and memory storing one or more computer programs executed by the one or more processors to perform the method, performing operations comprising:
detecting an indexing event within a content management application executing at the portable electronic device;
determining a content item, hosted with a content management service, to which the indexing event pertains;
determining if the indexing event indicates that an index entry for the content item should be added to an on-device index stored at the portable electronic device, wherein the on-device index is associated with an on-device index manager application of the portable electronic device, wherein the on-device index manager application is usable by a plurality of applications at the portable electronic device, including the content management application, to add index entries to the on-device index;
based on determining that the indexing event indicates that the index entry for the content item should be added to the on-device index, determining if a proxy entry for the content item already exists in a read surrogate database, wherein the read surrogate database is stored separately at the portable electronic device from the on-device index, wherein the read surrogate database is a read surrogate for the on-device index at least with respect to the content management application; and
based on determining that the proxy entry for the content item does not exist in the read surrogate database, using the on-device index manager application to add the index entry to the on-device index, and adding the proxy entry for the content item to the read surrogate database.

2. The method of claim 1, wherein the indexing event corresponds to a user viewing the content item using the content management application.

3. The method of claim 1, wherein the indexing event corresponds to a user posting a comment on the content item using the content management application.

4. The method of claim 1, wherein the indexing event corresponds to a user, using the content management application, making the content item available for offline access at the portable electronic device.

5. The method of claim 1, wherein the indexing event corresponds to a user, using the content management application, marking the content item as a favorite.

6. The method of claim 1, wherein the indexing event corresponds to the content management application receiving a network response from a server operated by the content management service indicating successful generation of a shared link for the content item.

7. The method of claim 1, wherein the content item is a file content item; and wherein the indexing event corresponds to the content management application receiving a network response from a server operated by the content management service indicating that an operation to move or copy the file content item to a target folder content item was successfully performed.

8. The method of claim 1, wherein the content item is a folder content item; and wherein the indexing event corresponds to the content management application receiving a network response from a server operated by the content management service indicating an operation to convert the folder content item to a shared folder was successfully performed.

9. A method, comprising:
at a portable electronic device comprising one or more processors and memory storing one or more computer programs executed by the one or more processors to perform the method, performing operations comprising:
detecting an indexing event within a content management application executing at the portable electronic device;
determining a content item, hosted with a content management service, to which the indexing event pertains;
determining if the indexing event indicates that an index entry for the content item should be removed from an on-device index stored at the portable electronic device, wherein the on-device index is associated with an on-device index manager application of the portable electronic device, wherein the on-device index manager application is usable by a plurality of applications at the portable electronic device, including the content management application, to add and remove index entries to the on-device index;
based on determining that the indexing event indicates that the index entry for the content item should be removed from the on-device index, determining if a proxy entry for the content item already exists in a read surrogate database, wherein the read surrogate database is stored separately at the portable electronic device from the on-device index, wherein the read surrogate database is a read surrogate for the on-device index at least with respect to the content management application; and
based on determining that the proxy entry for the content item exists in the read surrogate database, using the on-device index manager application to remove the index entry from the on-device index, and removing the proxy entry for the content item from the read surrogate database.

10. The method of claim 9, wherein the indexing event corresponds to a user deleting the content item using the content management application.

11. A portable electronic device, comprising:
one or more processors; and
memory storing one or more computer programs for execution by the one or more processors, the one or more computer programs comprising instructions for:
detecting an indexing event within a content management application executing at the portable electronic device;
determining a content item, hosted with a content management service, to which the indexing event pertains;
determining if the indexing event indicates that an index entry for the content item should be added to an on-device index stored at the portable electronic device, wherein the on-device index is associated with an on-device index manager application of the portable electronic device, wherein the on-device index manager application is usable by a plurality of applications at the portable electronic device, including the content management application, to add index entries to the on-device index;
based on determining that the indexing event indicates that the index entry for the content item should be added to the on-device index, determining if a proxy entry for the content item already exists in a read surrogate database, wherein the read surrogate database is stored separately at the portable electronic device from the on-device index, wherein the read surrogate database is a read surrogate for the on-device index at least with respect to the content management application; and
based on determining that the proxy entry for the content item does not exist in the read surrogate database, using the on-device index manager application to add the index entry to the on-device index, and adding the proxy entry for the content item to the read surrogate database.

12. The portable electronic device of claim 11, wherein the indexing event corresponds to a user viewing the content item using the content management application.

13. The portable electronic device of claim 11, wherein the indexing event corresponds to a user posting a comment on the content item using the content management application.

14. The portable electronic device of claim 11, wherein the indexing event corresponds to a user, using the content management application, making the content item available for offline access at the portable electronic device.

15. The portable electronic device of claim 11, wherein the indexing event corresponds to a user, using the content management application, marking the content item as a favorite.

16. The portable electronic device of claim 11, wherein the indexing event corresponds to the content management application receiving a network response from a server operated by the content management service indicating successful generation of a shared link for the content item.

17. The portable electronic device of claim 11, wherein the content item is a file content item; and wherein the indexing event corresponds to the content management application receiving a network response from a server operated by the content management service indicating that an operation to move or copy the file content item to a target folder content item was successfully performed.

18. The portable electronic device of claim 11, wherein the content item is a folder content item; and wherein the indexing event corresponds to the content management application receiving a network response from a server operated by the content management service indicating an operation to convert the folder content item to a shared folder was successfully performed.

19. A portable electronic device, comprising:
one or more processors; and
memory storing one or more computer programs for execution by the one or more processors, the one or more computer programs comprising instructions for:
detecting an indexing event within a content management application executing at the portable electronic device;
determining a content item, hosted with a content management service, to which the indexing event pertains;
determining if the indexing event indicates that an index entry for the content item should be removed from an on-device index stored at the portable electronic device, wherein the on-device index is associated with an on-device index manager application of the portable electronic device, wherein the on-device index manager application is usable by a plurality of applications at the portable electronic device, including the content management application, to add and remove index entries to the on-device index;
based on determining that the indexing event indicates that the index entry for the content item should be removed from the on-device index, determining if a proxy entry for the content item already exists in a read surrogate database, wherein the read surrogate database is stored separately at the portable electronic device from the on-device index, wherein the read surrogate database is a read surrogate for the on-device index at least with respect to the content management application; and
based on determining that the proxy entry for the content item exists in the read surrogate database, using the on-device index manager application to remove the index entry from the on-device index, and removing the proxy entry for the content item from the read surrogate database.

20. The portable electronic device of claim 19, wherein the indexing event corresponds to a user deleting the content item using the content management application.

21. One or more non-transitory computer-readable media storing one or more computer programs which, when executed by one or more processors of a portable electronic device, cause the portable electronic device to perform operations comprising:
detecting an indexing event within a content management application executing at the portable electronic device;
determining a content item, hosted with a content management service, to which the indexing event pertains;
determining if the indexing event indicates that an index entry for the content item should be added to an on-device index stored at the portable electronic device, wherein the on-device index is associated with an on-device index manager application of the portable electronic device, wherein the on-device index manager application is usable by a plurality of applications at the portable electronic device, including the content management application, to add index entries to the on-device index;

based on determining that the indexing event indicates that the index entry for the content item should be added to the on-device index, determining if a proxy entry for the content item already exists in a read surrogate database, wherein the read surrogate database is stored separately at the portable electronic device from the on-device index, wherein the read surrogate database is a read surrogate for the on-device index at least with respect to the content management application; and based on determining that the proxy entry for the content item does not exist in the read surrogate database, using the on-device index manager application to add the index entry to the on-device index, and adding the proxy entry for the content item to the read surrogate database.

22. The one or more non-transitory computer-readable media of claim 21, wherein the indexing event corresponds to a user viewing the content item using the content management application.

23. The one or more non-transitory computer-readable media of claim 21, wherein the indexing event corresponds to a user posting a comment on the content item using the content management application.

24. The one or more non-transitory computer-readable media of claim 21, wherein the indexing event corresponds to a user, using the content management application, making the content item available for offline access at the portable electronic device.

25. The one or more non-transitory computer-readable media of claim 21, wherein the indexing event corresponds to a user, using the content management application, marking the content item as a favorite.

26. The one or more non-transitory computer-readable media of claim 21, wherein the indexing event corresponds to the content management application receiving a network response from a server operated by the content management service indicating successful generation of a shared link for the content item.

27. The one or more non-transitory computer-readable media of claim 21, wherein the content item is a file content item; and wherein the indexing event corresponds to the content management application receiving a network response from a server operated by the content management service indicating that an operation to move or copy the file content item to a target folder content item was successfully performed.

28. The one or more non-transitory computer-readable media of claim 21, wherein the content item is a folder content item; and wherein the indexing event corresponds to the content management application receiving a network response from a server operated by the content management service indicating an operation to convert the folder content item to a shared folder was successfully performed.

29. One or more non-transitory computer-readable media storing one or more computer programs which, when executed by one or more processors of a portable electronic device, cause the portable electronic device to perform operations comprising:

detecting an indexing event within a content management application executing at the portable electronic device;

determining a content item, hosted with a content management service, to which the indexing event pertains;

determining if the indexing event indicates that an index entry for the content item should be removed from an on-device index stored at the portable electronic device, wherein the on-device index is associated with an on-device index manager application of the portable electronic device, wherein the on-device index manager application is usable by a plurality of applications at the portable electronic device, including the content management application, to add and remove index entries to the on-device index;

based on determining that the indexing event indicates that the index entry for the content item should be removed from the on-device index, determining if a proxy entry for the content item already exists in a read surrogate database, wherein the read surrogate database is stored separately at the portable electronic device from the on-device index, wherein the read surrogate database is a read surrogate for the on-device index at least with respect to the content management application; and based on determining that the proxy entry for the content item exists in the read surrogate database, using the on-device index manager application to remove the index entry from the on-device index, and removing the proxy entry for the content item from the read surrogate database.

30. The one or more non-transitory computer-readable media of claim 29, wherein the indexing event corresponds to a user deleting the content item using the content management application.

\* \* \* \* \*